US010664208B2

(12) United States Patent
Suzuki (10) Patent No.: US 10,664,208 B2
(45) Date of Patent: May 26, 2020

(54) COMMUNICATION DEVICE

(71) Applicant: BROTHER KOGYO KABUSHIKI KAISHA, Nagoya-shi, Aichi (JP)

(72) Inventor: Satoshi Suzuki, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 311 days.

(21) Appl. No.: 15/717,238

(22) Filed: Sep. 27, 2017

(65) Prior Publication Data

US 2018/0136883 A1 May 17, 2018

(30) Foreign Application Priority Data

Nov. 14, 2016 (JP) ................. 2016-221362

(51) Int. Cl.
*G06F 3/12* (2006.01)
*G06F 1/32* (2019.01)
*G06K 15/00* (2006.01)
*G06F 1/3234* (2019.01)
*G06F 1/3209* (2019.01)
*G06F 1/3206* (2019.01)

(52) U.S. Cl.
CPC .......... *G06F 3/1221* (2013.01); *G06F 1/3209* (2013.01); *G06F 1/3234* (2013.01); *G06F 1/3278* (2013.01); *G06F 3/121* (2013.01); *G06F 3/1236* (2013.01); *G06F 3/1286* (2013.01); *G06K 15/4045* (2013.01); *G06K 15/4055* (2013.01); *G06F 1/3206* (2013.01)

(58) Field of Classification Search
None
See application file for complete search history.

(56) References Cited

U.S. PATENT DOCUMENTS

2009/0204836 A1* 8/2009 Diab ................ H04L 12/12
713/323
2011/0249592 A1* 10/2011 Tseng ............... H04L 49/3054
370/254

(Continued)

FOREIGN PATENT DOCUMENTS

JP 2012-227804 A 11/2012
JP 2014-014977 A 1/2014
JP 2015-177251 A 10/2015

*Primary Examiner* — Fahmida Rahman
(74) *Attorney, Agent, or Firm* — Scully, Scott, Murphy & Presser, PC (57) ABSTRACT

A communication device may detect a disconnection of a first communication link in spite of a communication interface executing a communication for maintaining a state of the first communication link with an external device being established by using a power saving method. The communication device may supply a prohibition instruction for prohibiting a use of the power saving method to the communication interface in a case where the disconnection of the first communication link is detected. The communication interface may maintain a state of a second communication link, which is different from the first communication link, being established by using a normal method without using the power saving method in a case where the communication interface establishes the second communication link with the external device after acquiring the prohibition instruction in response to the disconnection of the first communication link.

14 Claims, 5 Drawing Sheets

(56) References Cited

U.S. PATENT DOCUMENTS

2011/0312910 A1* 12/2011 Dikovskiy ........... A61K 31/575
                                                       514/53
2014/0009780 A1    1/2014  Hamachi
2015/0261282 A1    9/2015  Yamauchi \* cited by examiner

COMMUNICATION DEVICE

TECHNICAL FIELD

A communication device capable of establishing a communication link with an external device is disclosed in the present disclosure.

BACKGROUND ART

An information processing device is known which is capable of executing a power saving function (called "EEE (abbreviation of Energy Efficient Ethernet) function" below) according to IEEE (abbreviation of The Institute of Electrical and Electronics Engineers. Inc.) 802.3az. The information processing device executes an auto-negotiation with an external device connected thereto via a LAN cable, and determines whether a communication according to the EEE function can be executed with the external device. The information processing device informs a user of the result of the determination. In a case where the EEE function is used after an establishment of a communication link between the information processing device and the external device, the communication link can be maintained with less power consumption than in a case where the EEE function is not used.

SUMMARY

Even if an attempt is made to maintain the communication link using the EEE function, the communication link may be disconnected for some reason. When such a phenomenon occurs, a data communication between the information processing device and the external device cannot be executed appropriately.

The present disclosure discloses a technique which may appropriately maintain a communication link established between a communication device and an external device.

A communication device disclosed in the present disclosure may comprise a communication interface configured to establish a communication link with an external device and capable of selectively using any one of a normal method and a power saving method for maintaining a state of the communication link being established, a power consumption per unit time when the power saving method is used being lower than a power consumption per unit time when the normal method is used; a processor; and a memory storing computer-readable instructions therein, the computer-readable instructions, when executed by the processor, may cause the communication device to: detect a disconnection of a first communication link in spite of the communication interface executing a communication for maintaining a state of the first communication link with the external device being established by using the power saving method; and supply a prohibition instruction for prohibiting a use of the power saving method to the communication interface in a case where the disconnection of the first communication link is detected, wherein the communication interface is configured to maintain a state of a second communication link, which is different from the first communication link, being established by using the normal method without using the power saving method in a case where the communication interface establishes the second communication link with the external device after acquiring the prohibition instruction in response to the disconnection of the first communication link.

A control method, computer-readable instructions, and a non-transitory computer-readable recording medium storing the computer-readable instructions, for implementation of the aforementioned communication device are also novel and useful. Further, a communication system which comprises the aforementioned communication device and external device is also novel and useful.

Figure 1:
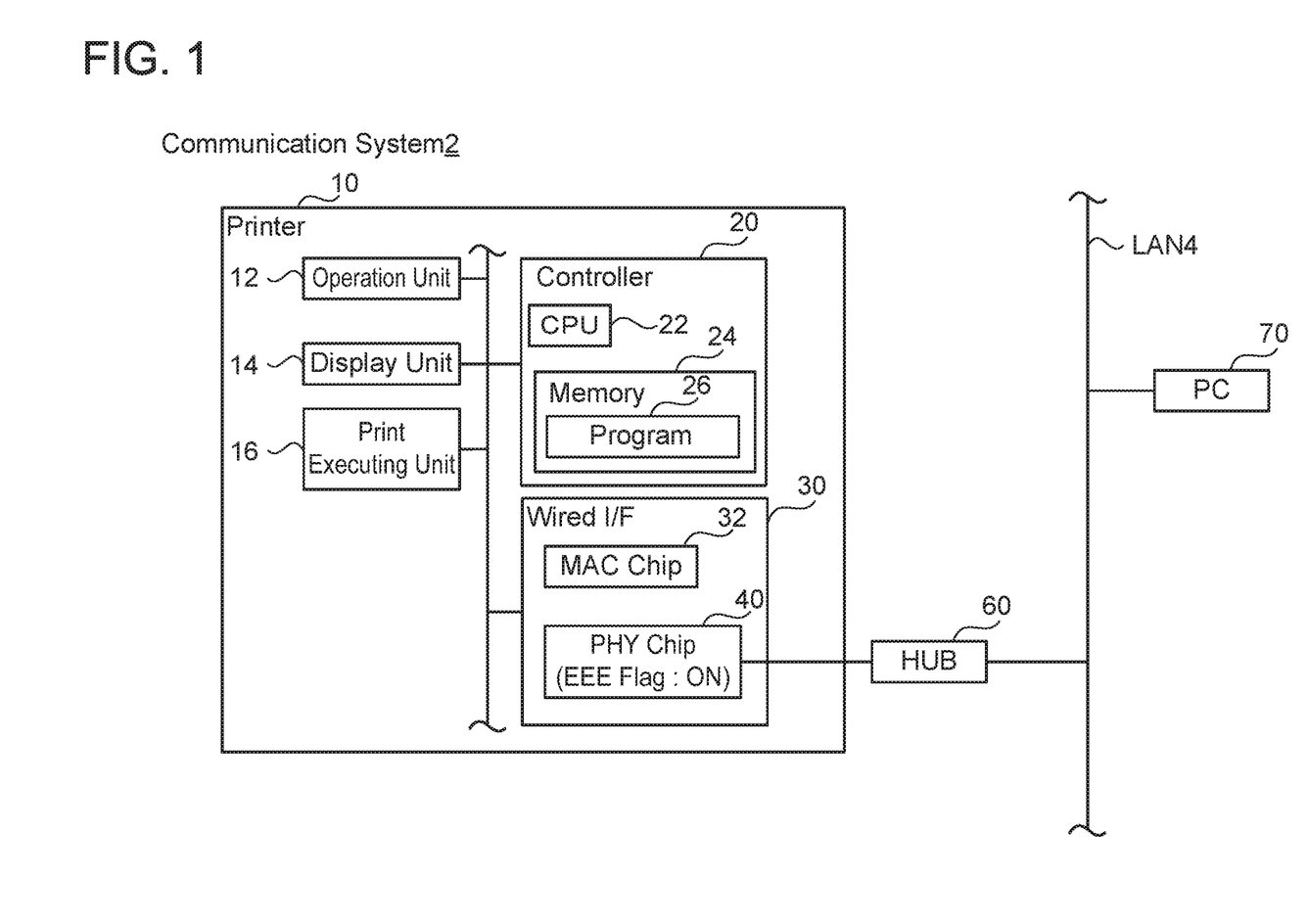
FIG. 1 shows a configuration of a communication system.

EMBODIMENT (Configuration of Communication System 2; FIG. 1)

As shown in FIG. 1, a communication system 2 comprises a printer 10 and a PC 70. The printer 10 and the PC 70 are capable of communicating with each other via a LAN (abbreviation of Local Area Network) 4. The LAN 4 is a wired network conforming to Ethernet (registered trademark), and comprises a HUB 60.

(Configuration of Printer 10)

The printer 10 comprises an operation unit 12, a display unit 14, a print executing unit 16, a controller 20, and a wired interface (interface is described as "I/F" below) 30. The operation unit 12 comprises a plurality of keys. A user can input various instructions to the printer 10 by operating the operation unit 12. The display unit 14 is a display for displaying various information. The display unit 14 also functions as a so-called touch panel. That is, the display unit 14 also functions as an operation unit. The print executing unit 16 comprises a printing mechanism such as an ink jet scheme, a laser scheme, or the like.

The controller 20 comprises a CPU 22 and a memory 24. The CPU 22 executes various processes in accordance with a program 26 stored in the memory 24. The memory 24 is constituted of a volatile memory, non-volatile memory, and the like.

One end of a LAN cable is connected to the wired I/F 30. The other end of the LAN cable is connected to the HUB 60. Thereby, a communication link is established between the wired I/F 30 and the HUB 60. The wired I/F 30 conforms to IEEE 802.3a, and to IEEE 802.3az which is an extension of IEEE 802.3a. IEEE 802.3a defines a standard related to Ethernet (registered trademark), and IEEE 802.3az is a standard adopting an EEE (abbreviation of Energy Efficient Ethernet) function which is a power saving function for maintaining a state where a communication link is established.

The wired I/F 30 comprises a MAC (abbreviation of Media Access Control) chip 32 and a PHY (abbreviation of Physical Layer) chip 40. The MAC chip 32 executes processing of a MAC layer which is a sublayer of a data link layer in an OSI (abbreviation of Open Systems Interconnection) reference model. The MAC chip 32 is connected to the PHY chip 40. The PHY chip 40 executes processing of a physical layer in the OSI reference model. The PHY chip 40 stores an EEE flag. The EEE flag indicates one of "ON" which indicates that the EEE function can be used, and "OFF" which indicates that the EEE function cannot be used. When a power of the printer 10 is turned on, the EEE flag is set in "ON" as an initial state.

(Configuration of HUB 60)

The HUB 60 conforms to IEEE 802.3a and IEEE 802.3az, and relays data to be communicated between the printer 10 and the PC 70.

Figure 2:
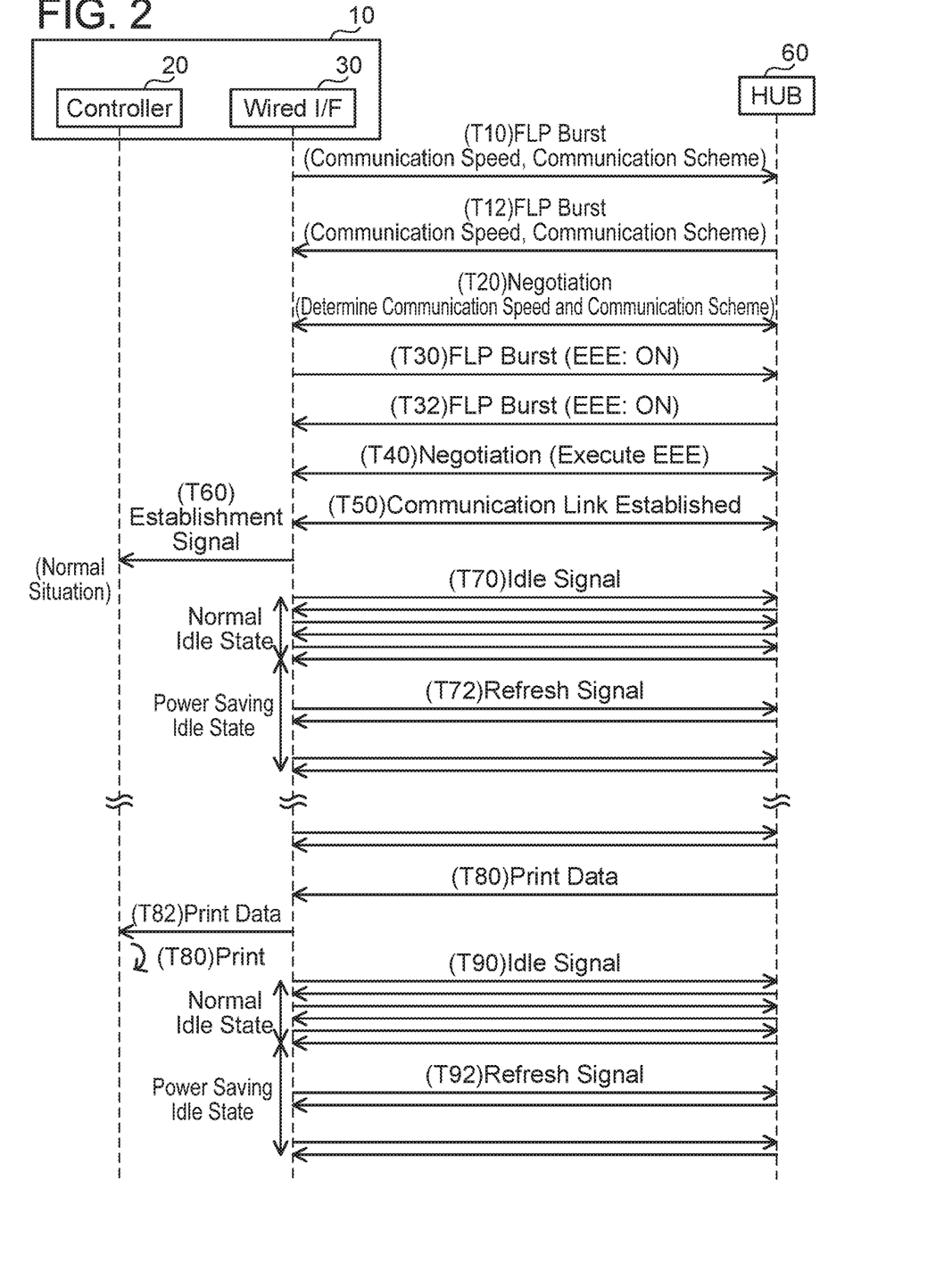
FIG. 2 shows a sequence diagram of a normal case in an embodiment.

(Process in Normal Case; FIG. 2)

Next, a case will be described with reference to FIG. 2 in which a state where a communication link between the printer 10 and the HUB 60 is established is maintained normally according to the EEE function. The process of FIG. 2 is started when the LAN cable is connected to each of the printer 10 and the HUB 60, and the power of the printer 10 is turned on.

In T10, the wired I/F 30 sends, to the HUB 60, an FLP (abbreviation of Fast Link Pulse) burst which indicates a plurality of combinations of communication speeds and communication schemes supported by the wired I/F 30, and in T12, receives, from the HUB 60, an FLP burst which indicates a plurality of combinations of communication speeds and communication schemes supported by the HUB 60. In the present embodiment, the wired I/F 30 supports three types of communication speeds: 10BASE-T (i.e., 10 Mbps), 100BASE-T (i.e., 100 Mbps), and 1000BASE-T (i.e., 1 Gbps). Further, the wired I/F 30 supports two types of communication schemes: full-duplex communication and half-duplex communication. Consequently, the FLP burst sent in T10 indicates six combinations of the communication speeds and the communication schemes (i.e., the three types of communication speeds× the two types of communication schemes). The full-duplex communication is a communication scheme capable of simultaneously executing sending and receiving of data. The half-duplex communication is a communication scheme not capable of simultaneously executing sending and receiving of data, and is a communication scheme for selectively executing one of the sending and receiving of data.

In T20, a communication speed and a communication scheme used in a communication link to be established between the wired I/F 30 and the HUB 60 are determined. Specifically, the wired I/F 30 selects the fastest communication speed among the plurality of types of communication speeds supported by both of the wired I/F 30 and the HUB 60. Then, in a case where the plurality of combinations indicated by the FLP burst received in T12 include a combination of the selected communication speed and the full-duplex communication, the wired I/F 30 determines that this combination should be used. Further, in a case where the plurality of combinations indicated by the FLP burst received in T12 do not include the combination of the selected communication speed and the full-duplex communication, but include a combination of the selected communication speed and the half-duplex communication, the wired I/F 30 determines that this combination should be used. Similarly, the HUB 60 also determines the communication speed and the communication scheme.

Next, in T30, the wired I/F 30 sends an FLP burst indicating that the EEE flag is "ON" to the HUB 60, and in T32, receives an FLP burst indicating that the EEE flag is "ON" from the HUB 60.

In T40, it is decided whether the EEE function is to be used or not to maintain the communication link. Specifically, in the present case, since both the FLP burst of T30 and the FLP burst of T32 indicate that the EEE flag is "ON", the wired I/F 30 decides that the EEE function is to be used. Similarly, the HUB 60 also decides that the EEE function is to be used. However, for example, in a case where at least one of the FLP burst of T30 and the FLP burst of T32 indicates that the EEE flag is "OFF", the wired I/F 30 decides that the EEE function is not to be used. The communications of T10 to T40 are collectively called "auto-negotiation".

In T50, the wired I/F 30 establishes the communication link with the HUB 60. Specifically, after having executed the auto-negotiation, the wired I/F 30 executes communications of various signals for establishing the communication link with the HUB 60, and establishes the communication link.

In T60, the wired I/F 30 supplies, to the controller 20, an establishment signal indicating that the communication link with the HUB 60 has been established. Thereby, the CPU 22 of the controller 20 can know that the communication link has been established.

Next, in T70, the wired I/F 30 shifts to a normal idle state. Similarly, the HUB 60 also shifts to the normal idle state. Here, the "idle state" is a state in which an upper layer communication using the established communication link is not being executed between the wired I/F 30 and the HUB 60. The "upper layer communication" is a communication according to an upper layer (e.g., application layer) in the OSI reference model, such as a communication of print data representing an image of a print target which is sent from the PC 70 to the printer 10. The "normal idle state" is a state in which a power consumption per unit time is higher than a power saving idle state (to be described later). In the normal idle state, the wired I/F 30 executes a communication of an idle signal for maintaining the communication link with the HUB 60. When the wired I/F 30 receives the idle signal from the HUB 60 before an extremely short period of time has elapsed since the wired I/F 30 sent the idle signal to the HUB 60, the wired I/F 30 determines that the communication link is being maintained. An interval at which the wired I/F 30 sends the idle signal and an interval at which the HUB 60 sends the idle signal are the same interval (called "first predetermined interval" below). As aforementioned, by repeating the sending and receiving of the idle signal, the wired I/F 30 maintains the state where the communication link with the HUB 60 is established.

Since the wired I/F 30 decided to use the EEE function in T40, when a state in which the upper layer communication is not executed continues for a first predetermined time in the normal idle state, the wired I/F 30 shifts to the power saving idle state according to the EEE function. Similarly, the HUB 60 also shifts to the power saving idle state.

Upon shifting to the power saving idle state, in T72, the wired I/F 30 executes a communication of a refresh signal for maintaining the communication link with the HUB 60. When the wired I/F 30 receives the refresh signal from the HUB 60 before an extremely short period of time has elapsed since the wired I/F 30 sent the refresh signal to the HUB 60, the wired I/F 30 determines that the communication link is being maintained. An interval at which the wired I/F 30 sends the refresh signal and the interval at which the HUB 60 sends the refresh signal are the same interval (called "second predetermined interval" below). The second predetermined interval is longer than the first predetermined interval. That is, a frequency at which the wired I/F 30 sends the refresh signal in the power saving idle state is less than a frequency at which the wired I/F 30 sends the idle signal in the normal idle state. Consequently, the power consumption per unit time of the wired I/F 30 (i.e., the printer 10) in the power saving idle state is lower than the power consumption per unit time of the wired I/F 30 in the normal idle state. As a result, the power consumption of the printer 10 while the upper layer communication is not being executed can be reduced.

When an operation for causing the printer 10 to execute a print is performed on the PC 70 by the user, print data is sent from the PC 70 to the printer 10 via the HUB 60. The communication of the print data is the upper layer communication including a communication of the application layer. In T80, the wired I/F 30 receives the print data from the HUB 60 by using the communication link established in T50, and in T82, supplies the print data to the controller 20. In this case, in T84, the controller 20 supplies the print data acquired from the wired I/F 30 to the print executing unit 16, and causes the print executing unit 16 to execute a print of an image represented by the print data.

When the supply of the print data to the controller 20 is completed, the wired I/F 30 shifts from the state of executing the upper layer communication to the normal idle state. The HUB 60 also shifts similarly Subsequent T90, 92 are the same as T70, T72, respectively. It should be noted, in a case where the printer 10 is connected to the PC 70 not via the HUB 60, the operation of FIG. 2 is realized between the printer 10 and the PC 70. Further, in a case where the printer 10 is connected to a router instead of the HUB 60, the operation of FIG. 2 is realized between the printer 10 and the router.

Figure 3:
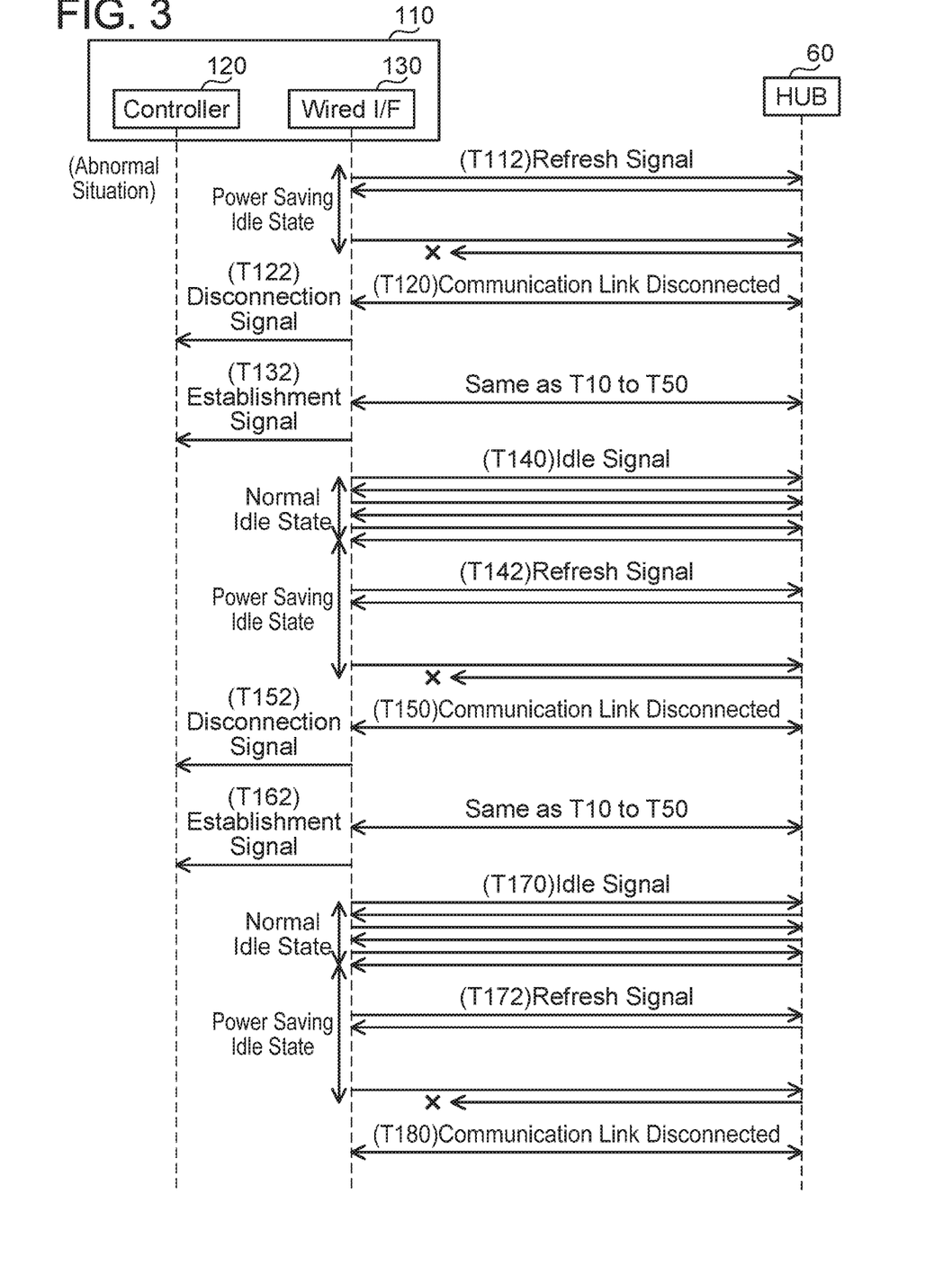
FIG. 3 shows a sequence diagram of a comparative example.

Comparative Example; FIG. 3

Next, a case will be described with reference to FIG. 3 in which a communication link is not appropriately maintained between a printer 110 of a comparative example, which is different from the printer 10, and the HUB 60. The printer 110 and the HUB 60 operate in the same way as T10 to T70 of FIG. 2, and then, shift to the power saving idle state. In FIG. 3, an operation after the printer 110 and the HUB 60 have shifted to the power saving idle state is shown.

In T112, a wired I/F 130 of the printer 110 executes a communication of the refresh signal. Since both the wired I/F 130 and the HUB 60 conform to IEEE 802.3az, the wired I/F 130 normally receives the refresh signal from the HUB 60 before an extremely short period of time has elapsed since the wired I/F 130 sent the refresh signal to the HUB 60. However, the wired I/F 130 may not, for some reason, receive the refresh signal from the HUB 60 before the aforementioned extremely short period of time has elapsed. Such a cause is not resulted from the user (e.g., the user does not pull out the LAN cable), but such a phenomenon may occur, for example, if a relatively large difference occurs between a timing at which the wired I/F 130 sends the refresh signal and a timing at which the HUB 60 sends the refresh signal. In this case, in T120, the wired I/F 130 detects that the communication link has been disconnected. Then, in T122, the wired I/F 130 supplies a disconnection signal indicating that the communication link has been disconnected to a controller 120 of the printer 110. Thereby, the controller 120 determines that the communication link has been disconnected.

Since the LAN cable is connected to each of the printer 110 and the HUB 60, the wired I/F 130 again executes the auto-negotiation with the HUB 60 after the communication link was disconnected in T120, and re-establishes the communication link (same as T10 to T50 of FIG. 2). In this case, in T132, the wired I/F 130 supplies the establishment signal to the controller 120. T140, T142 are the same as T70, T72 of FIG. 2. However, upon shifting to the power saving idle state, the wired I/F 130 cannot receive the refresh signal from the HUB 60, same as in T112 and T120. As a result, the communication link is disconnected again in T150, and the disconnection signal is supplied in T152. Thereafter, in the same manner, the establishment and the disconnection of the communication link are executed again in T162 to T180. As aforementioned, the phenomenon occurs in which the establishment and the disconnection of the communication link are repeated between the printer 110 and the HUB 60. As a result, the printer 110 and the HUB 60 cannot appropriately execute the upper layer communication. Below, occurrence of such a phenomenon of the comparative example is expressed as "compatibility of two devices is poor". In the present embodiment, a process of FIG. 4 to be described next is executed in order to maintain the state where the communication link is established even in a situation where compatibility of two devices is poor.

Figure 4:
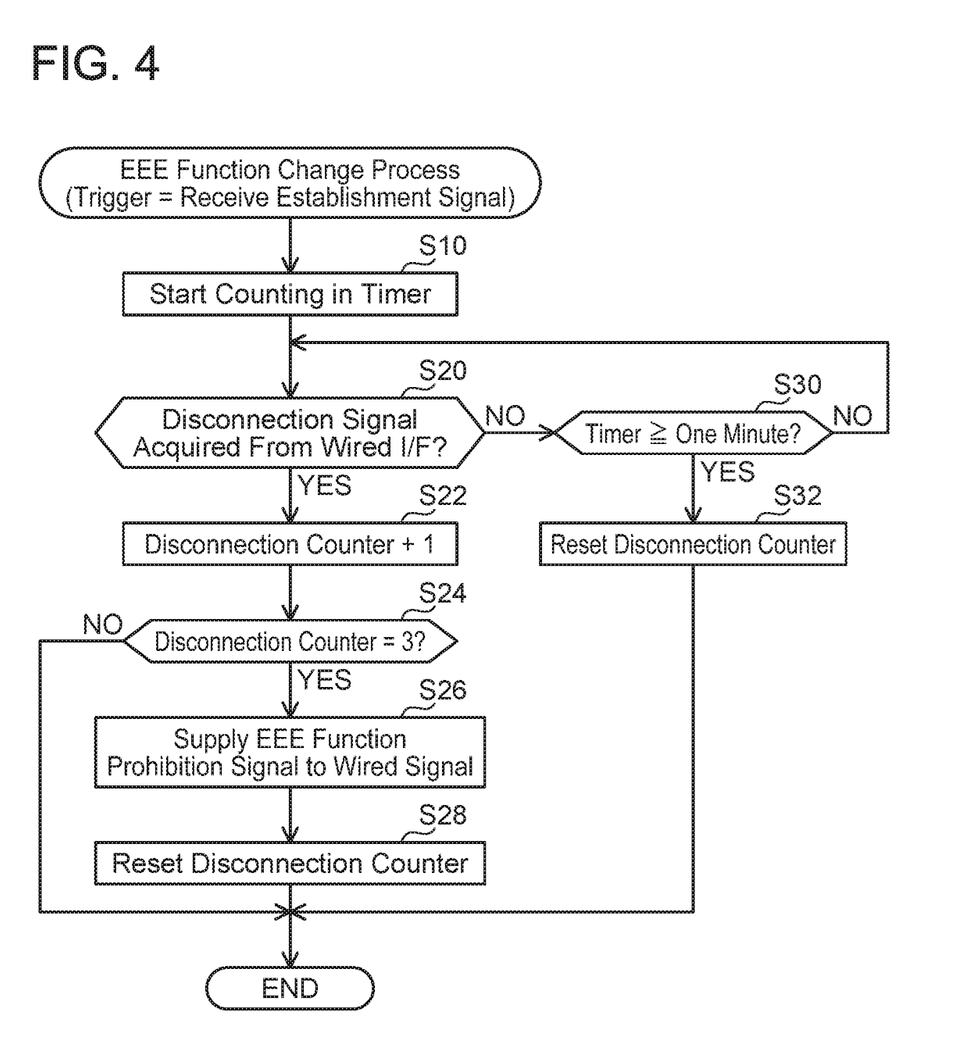
FIG. 4 shows a flowchart of an EEE function change process.

(EEE Function Change Process; FIG. 4)

Next, an EEE function change process executed by the CPU 22 of the present embodiment will be described with reference to FIG. 4. The CPU 22 starts the process of FIG. 4 in a case of receiving a first establishment signal (see T60 of FIG. 2) from the wired I/F 30 after the power of the printer 10 has been turned on. In S10, the CPU 22 starts counting in a timer.

In S20, the CPU 22 monitors whether the disconnection signal is acquired from the wired I/F 30. The disconnection signal is a signal supplied from the wired I/F 30 to the controller 20 in the case where the wired I/F 30 detects the disconnection of the communication link (see T122, T152 of FIG. 3). In a case of receiving the disconnection signal from the wired I/F 30, the CPU 22 determines YES in S20, and proceeds to S22.

Further, simultaneously with the monitoring of S20, in S30, the CPU 22 monitors whether a value of the timer exceeds a predetermined value (one minute, in the present embodiment). In a case where the value of the timer exceeds the predetermined value, the CPU 22 determines YES in S30, and proceeds to S32.

In S32, the CPU 22 resets a disconnection counter (to be described later), and initializes a value of the disconnection counter to zero. When S32 ends, the CPU 22 ends the process of FIG. 4. In this case, the CPU 22 does not execute the process of FIG. 4 until the power of the printer 10 is turned on again after having been turned off. Thereby, a processing load can be reduced.

In S22, the CPU 22 increments the value of the disconnection counter only by "1". The disconnection counter is a counter for counting a number of times the communication link is disconnected.

In S24, the CPU 22 determines whether the value of the disconnection counter has reached "3". That is, the CPU 22 determines whether a phenomenon in which the communication link is disconnected has occurred three times before one minute has elapsed since the communication link with the HUB 60 was established for the first time (NO in S30) after the power of the printer 10 had been turned on. In a case of determining that the value of the disconnection counter has reached "3" (YES in S24), the CPU 22 proceeds to S26. On the other hand, in a case of determining that the value of the disconnection counter is less than "3" (NO in S24), the CPU 22 returns to S20.

In S26, the CPU 22 supplies an EEE function prohibition signal to the wired I/F 30. The EEE function prohibition signal is a signal for instructing the EEE flag stored in the PHY chip 40 to change from "ON" to "OFF". Thereby, the wired I/F 30 changes the EEE flag from "ON" to "OFF". As a result, when the auto-negotiation is executed between the wired I/F 30 and the HUB 60, the wired I/F 30 sends an FLP burst including the EEE flag "OFF" to the HUB 60. Consequently, it is decided that the EEE function should not be used between the wired I/F 30 and the HUB 60.

S28 is the same as S32. When S28 ends, the CPU 22 ends the process of FIG. 4. In this case as well, the CPU 22 does not execute the process of FIG. 4 until the power of the printer 10 is again turned on after having been turned off. Then, the EEE flag is maintained in "OFF" until the power of the printer 10 is again turned on.

Figure 5:
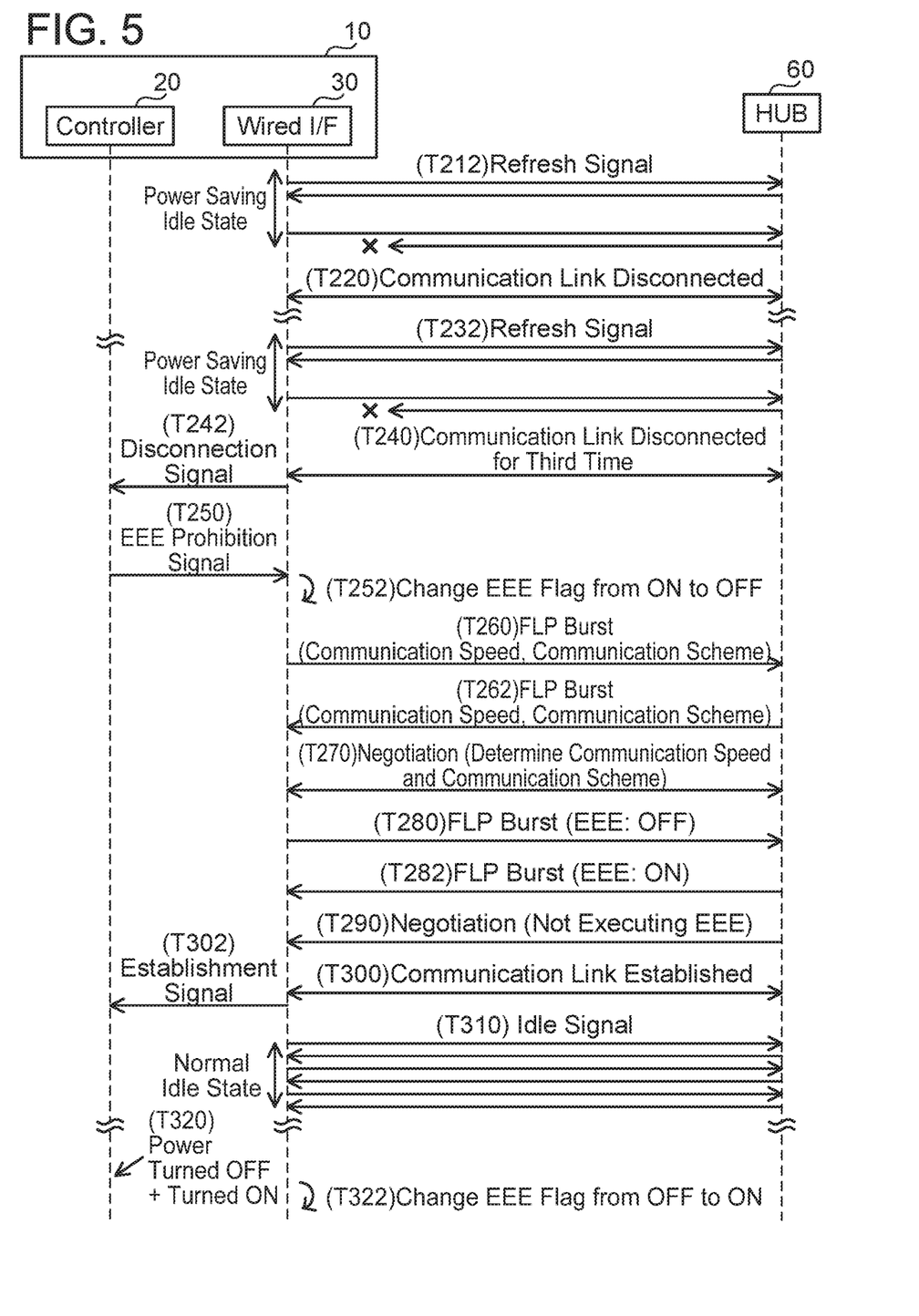
FIG. 5 shows a sequence diagram of an abnormal case in the embodiment.

(Process in Abnormal Case; FIG. 5)

Next, a specific case realized by the process of FIG. 4 will be described with reference to FIG. 5. FIG. 5 shows a state after the shifting to the power saving idle state through T10 to T70 of FIG. 2. When the controller 20 acquired the first establishment signal from the wired I/F 30 in T60 of FIG. 2, the controller 20 started the process of FIG. 4, and started the counting in the timer (S10 of FIG. 4).

In T212, the wired I/F 30 executes the communication of the refresh signal. Same as in the case of FIG. 3, the phenomenon occurs in which the refresh signal is not received from the HUB 60 before the extremely short period of time has elapsed since the wired I/F 30 sent the refresh signal. In this case, in T220, the wired I/F 30 detects that the communication link has been disconnected, and supplies a first disconnection signal to the controller 20. Upon acquiring the first disconnection signal (YES in S20), the controller 20 increments the disconnection counter from "0" to "1" (S22), and determines that the disconnection counter is less than "3" (NO in S24).

Thereafter, the establishment and the disconnection of the communication link between the printer 10 and the HUB 60 are repeated. T232, T240 are respectively the same as T212, T220, except that they relate to the communication link established for the third time. Upon acquiring a third disconnection signal (T242, YES in S20), the controller 20 increments the disconnection counter from "2" to "3" (S22), and determines that the disconnection counter has reached "3" (YES in S24). In this case, in T250, the controller 20 supplies the EEE function prohibition signal to the wired I/F 30 (S26).

Upon acquiring the EEE function prohibition signal, in T252, the wired I/F 30 changes the EEE flag from "ON" to "OFF". Then, in T260 to T290, the wired I/F 30 again executes the auto-negotiation with the HUB 60. T260 to T290, except T280 and T290, are the same as T10 to T40. In T280, the wired I/F 30 sends an FLP burst indicating that the EEE flag is "OFF" to the HUB 60. Since the FLP burst of T280 indicates that the EEE flag is "OFF, in T290, it is decided that the EEE function should not be used.

In T300, the wired I/F 30 establishes the communication link with the HUB 60, and in T302, supplies the establishment signal to the controller 20. In this case, the controller 20 does not execute the process of FIG. 4.

T310 is the same as T70 of FIG. 2. Then, since the wired I/F 30 decided in T290 that the EEE function should not be used, even when the state where the upper layer communication is not executed continues for the first predetermined time in the normal idle state, the wired I/F 30 maintains to be in the normal idle state without shifting to the power saving idle state. Thereby, the phenomenon in which the communication link is disconnected due to the shifting to the power saving idle state (T220, T240) can be suppressed from occurring, and the state where the communication link of T300 is established can be maintained.

Thereafter, in T320, when the user performs, after having turned off the power of the printer 10, an operation of turning the power of the printer 10 back on, the wired I/F 30 returns the EEE flag, which was changed to "OFF" in T252, to "ON". Thereby, the printer 10 can use the EEE function.

Effect of Present Embodiment

In the case where the compatibility of the printer 10 and the HUB 60 is poor, when the wired I/F 30 is operated in the power saving idle state, the phenomenon may occur in which the establishment and the disconnection of the communication link are repeated (T220, T240 of FIG. 5). In this case, the printer 10 and the HUB 60 cannot appropriately execute the upper layer communication. For this reason, in the present embodiment, in the case where the communication link has been disconnected three times before one minute has elapsed since the communication link was established for the first time after the power of the printer 10 had been turned on (T242), the controller 20 supplies the EEE function prohibition signal to the wired I/F 30 (T250). Thereby, the wired I/F 30 maintains the state where the communication link is established (T310) using the normal idle state. Consequently, the printer 10 and the HUB 60 can appropriately execute the upper layer communication by using the communication link.

(Correspondence Relationships)

The printer 10, the wired I/F 30 and the HUB 60 are examples of "communication device", "communication interface" and "external device", respectively. The power saving idle state and the normal idle state are examples of "power saving method" and "normal method", respectively. The communication link disconnected in T240 and the communication link established in T300 in FIG. 5 are examples of "first communication link" and "second communication link", respectively. The communication link established for the first time (e.g., the communication link disconnected in T220) is an example of "specific communication link". The phenomenon in which the communication link has been disconnected three times before one minute has elapsed since the communication link was established for the first time is an example of "predetermined condition". The EEE function prohibition signal is an example of "prohibition instruction". The FLP burst including the EEE flag "ON" (e.g., T30 of FIG. 2) and the FLP burst including the EEE flag "OFF" (e.g., T280 of FIG. 5) are examples of "first communication information" and "second communication information", respectively. The idle signal communicated in the normal idle state and the refresh signal communicated in the power saving idle state are examples of "first confirmation signal" and "second confirmation signal", respectively.

(Modification 1)

"Power saving method" may be a Green Ethernet function or a Legacy power save function. The Green Ethernet function is a technique for detecting a length of the LAN cable between the printer 10 and the HUB 60 and suppressing a power consumption upon sending a signal, according to the length. For example, in a case where the communication link is disconnected in a state where the Green Ethernet function is being used, the CPU 22 may supply a signal for prohibiting the use of the Green Ethernet function to the wired I/F 30. In the present modification, this signal is an example of "prohibition instruction". Further, the Legacy power save function is a technique, in a case where the printer 10 has established a wireless communication link with, for example, an access point, for suppressing a power consumption when the printer 10 executes a communication of a signal for maintaining the state where the wireless communication link is established with the access point. For example, in a case where the wireless communication link is disconnected in a state where the Legacy power save function is being used, the CPU 22 may supply a signal for prohibiting the use of the Legacy power save function to a wireless I/F. In this case, this signal is an example of "prohibition instruction", and the wireless I/F is an example of "communication interface".

(Modification 2)

In a case where the printer 10 and the HUB 60 support both of the EEE function and the Green Ethernet function, the wired I/F 30 may maintain the communication link by using both the EEE function and the Green Ethernet function. In this case, in a case where the communication link is disconnected, the CPU 22 supplies the EEE function prohibition signal to the wired I/F 30. Thereafter, in a case where the wired I/F 30 re-establishes the communication link, the CPU 22 may maintain the communication link by using only the Green Ethernet function. In the present modification, the communication link established earlier and the communication link established later are examples of "first communication link" and "second communication link", respectively. Further, both the EEE function and the Green Ethernet function are examples of "power saving method", and only the Green Ethernet function is an example of "normal method".

(Modification 3)

The threshold adopted in S24 may not be "3", but may be "2" or less, or "4" or more. For example, in a case where the threshold is "1", a phenomenon where the communication link established for the first time is disconnected before the predetermined time has elapsed since the communication link was established is an example of "predetermined condition".

(Modification 4)

The CPU 22 may treat, for example, five seconds as one section, and in a case where the communication link is disconnected at least once in each of three sections immediately after the communication link for the first time has been established, the CPU 22 may supply the EEE function prohibition signal to the wired I/F 30. In the present modification, the phenomenon where the communication link is disconnected at least once in each of the three sections is an example of "predetermined condition".

(Modification 5)

In a case where the communication link is disconnected after the process of FIG. 4 has ended through S32 of FIG. 4, and thereafter the communication link is newly established, the CPU 22 may re-execute the process of FIG. 4. In the present modification, the communication link newly established is an example of "specific communication link".

(Modification 6)

The CPU 22 may supply the EEE function prohibition signal to the wired I/F 30 in a case where the value of the disconnection counter reaches N regardless of the time that has elapsed since the communication link for the first time was established. The aforementioned N may be "1" or "2". In the present modification, "determine whether a predetermined condition related to disconnection frequency of the communication link is satisfied" may be omitted, and the communication link established for the $N_{th}$ time since the power of the printer 10 was turned on is an example of "first communication link".

(Modification 7)

In the FLP burst of T20 in FIG. 2, when only one fixed communication speed is sent without sending the plurality of combinations of the communication speeds and the communication schemes, the communications of the FLP bursts of T30 and T32 are not normally executed. That is, the negotiation related to the EEE function is not executed. Using this configuration, in S26 of FIG. 4, the CPU 22 may supply, to the wired I/F 30, an instruction for sending an FLP burst including only the one fixed communication speed. Thereby, the use of the EEE function can be prohibited. In the present modification, this instruction is an example of "prohibition instruction".

(Modification 8)

In the above embodiment, the printer 10 uses the EEE function automatically, however, instead of that, the printer 10 may switch whether to use the EEE function or not in response to a setting specified by the user. For example, in a case where a setting indicating the EEE function "ON" is set by the user, "ON" is constantly stored as the EEE flag in the wired I/F 30, and the EEE flag is not changed from "ON" to "OFF" (i.e., the process of FIG. 4 is not executed). Further, in a case where a setting indicating the EEE function "OFF" is set by the user, "OFF" is constantly stored as the EEE flag in the wired I/F 30. Further, in a case where a setting indicating the EEE function "AUTO" is set by the user, "ON" is stored as the EEE flag in the wired I/F 30 in the initial state and the EEE flag can be changed from "ON" to "OFF" in response to the process of FIG. 4 same as in the present embodiment.

(Modification 9)

In the above embodiment, each of the processes of FIG. 2, FIG. 4, and FIG. 5 is implemented by the CPU 22 executing the program 26 (i.e., software). Instead, any of the processes may be implemented by hardware such as a logic circuit.

What is claimed is:

1. A communication device comprising:
    a communication interface configured to establish a communication link with an external device and capable of selectively using any one of a normal method and a power saving method for maintaining a state of the communication link being established, a power consumption per unit time when the power saving method is used being lower than a power consumption per unit time when the normal method is used;
    a processor; and
    a memory storing computer-readable instructions therein, the computer-readable instructions, when executed by the processor, causing the communication device to:
    detect a disconnection of a first communication link in spite of the communication interface executing a communication for maintaining a state of the first communication link with the external device being established by using the power saving method; and
    determine whether a predetermined condition related to disconnection frequency of the communication link is satisfied in a case where the disconnection of the first communication link is detected, the predetermined condition including that a number of times that the communication link is disconnected reaches a predetermined number before a predetermined time has elapsed since a specific communication link with the external device was established, and the predetermined number being an integer greater than or equal to 2; and
    supply a prohibition instruction for prohibiting a use of the power saving method to the communication interface in the case where the disconnection of the first communication link is detected and in a case where it is determined that the predetermined condition is satisfied, wherein the prohibition instruction is not supplied to the communication interface in a case where it is determined that the predetermined condition is not satisfied, wherein the communication interface is configured to maintain a state of a second communication link, which is different from the first communication link, being established by using the normal method without using the power saving method in a case where the communication interface establishes the second communication link with the external device after acquiring the prohibition instruction in response to the disconnection of the first communication link.

2. The communication device as in claim 1, wherein
the specific communication link is a communication link established for the first time between the communication interface and the external device, and
after the predetermined time has elapsed without the prohibition instruction having been supplied to the communication interface since the specific communication link was established:
whether the predetermined condition is satisfied is not determined; and
the prohibition instruction is not supplied to the communication interface.

3. The communication device as in claim 1, wherein
the communication interface is configured to send first communication information to the external device before establishing the first communication link with the external device, the first communication information indicating that the communication interface is capable of using the power saving method,
the prohibition instruction is for prohibiting the communication interface from sending the first communication information, and
the communication interface is configured to send second communication information to the external device after acquiring the prohibition instruction in response to the disconnection of the first communication link and before establishing the second communication link with the external device, the second communication information indicating that the communication interface is incapable of using the power saving method.

4. The communication device as in claim 3, wherein
the power saving method is for maintaining a state of the communication link being established according to an EEE (abbreviation of Energy Efficient Ethernet) function,
the first communication information indicates that the communication interface uses the EEE function, and
the second communication information indicates that the communication interface does not use the EEE function.

5. The communication device as in claim 1, wherein
the communication interface is configured to execute a communication of a first confirmation signal with the external device at a first predetermined interval in a state of the communication interface using the normal method, and
the communication interface is configured to execute a communication of a second confirmation signal with the external device at a second predetermined interval which is longer than the first predetermined interval in a state of the communication interface using the power saving method.

6. The communication device as in claim 1, wherein
the communication interface is for executing a wired communication.

7. A non-transitory computer-readable recording medium storing computer-readable instructions for a communication device,
wherein the computer-readable instructions, when executed by a processor of the communication device, causes the communication device to:
detect a disconnection of a first communication link in spite of a communication interface of the communication device executing a communication for maintaining a state of the first communication link with an external device being established by using a power saving method, the communication interface being configured to establish a communication link with the external device and capable of selectively using any one of a normal method and the power saving method for maintaining a state of the communication link being established, a power consumption per unit time when the power saving method is used being lower than a power consumption per unit time when the normal method is used; and
determine whether a predetermined condition related to disconnection frequency of the communication link is satisfied in a case where the disconnection of the first communication link is detected, the predetermined condition including that a number of times that the communication link is disconnected reaches a predetermined number before a predetermined time has elapsed since a specific communication link with the external device was established, and the predetermined number being an integer greater than or equal to 2; and
supply a prohibition instruction for prohibiting a use of the power saving method to the communication interface in the case where the disconnection of the first communication link is detected, and in a case where it is determined that the predetermined condition is satisfied,
wherein the prohibition instruction is not supplied to the communication interface in a case where it is determined that the predetermined condition is not satisfied,
wherein the communication interface is configured to maintain a state of a second communication link, which is different from the first communication link, being established by using the normal method without using the power saving method in a case where the communication interface establishes the second communication link with the external device after acquiring the prohibition instruction in response to the disconnection of the first communication link.

8. The non-transitory computer-readable recording medium as in claim 7, wherein
the specific communication link is a communication link established for the first time between the communication interface and the external device, and
after the predetermined time has elapsed without the prohibition instruction having been supplied to the communication interface since the specific communication link was established:
whether the predetermined condition is satisfied is not determined; and
the prohibition instruction is not supplied to the communication interface.

9. The non-transitory computer-readable recording medium as in claim 7, wherein
the communication interface is configured to send first communication information to the external device before establishing the first communication link with the external device, the first communication information indicating that the communication interface is capable of using the power saving method, the prohibition instruction is for prohibiting the communication interface from sending the first communication information, and the communication interface is configured to send second communication information to the external device after acquiring the prohibition instruction in response to the disconnection of the first communication link and before establishing the second communication link with the external device, the second communication information indicating that the communication interface is incapable of using the power saving method.

10. The non-transitory computer-readable recording medium as in claim 9, wherein the power saving method is for maintaining a state of the communication link being established according to an EEE (abbreviation of Energy Efficient Ethernet) function, the first communication information indicates that the communication interface uses the EEE function, and the second communication information indicates that the communication interface does not use the EEE function.

11. The non-transitory computer-readable recording medium as in claim 7, wherein the communication interface is configured to execute a communication of a first confirmation signal with the external device at a first predetermined interval in a state of the communication interface is using the normal method, and the communication interface is configured to execute a communication of a second confirmation signal with the external device at a second predetermined interval which is longer than the first predetermined interval in a state of the communication interface using the power saving method.

12. The non-transitory computer-readable recording medium as in claim 7, wherein the communication interface is for executing a wired communication.

13. A method performed by a communication device, the method comprising:

detecting a disconnection of a first communication link in spite of a communication interface of the communication device executing a communication for maintaining a state of the first communication link with an external device being established by using a power saving method, the communication interface being configured to establish a communication link with the external device and capable of selectively using any one of a normal method and the power saving method for maintaining a state of the communication link being established, a power consumption per unit time when the power saving method is used being lower than a power consumption per unit time when the normal method is used; and determine whether a predetermined condition related to disconnection frequency of the communication link is satisfied in a case where the disconnection of the first communication link is detected, the predetermined condition including that a number of times that the communication link is disconnected reaches a predetermined number before a predetermined time has elapsed since a specific communication link with the external device was established, and the predetermined number being an integer greater than or equal to 2; and supplying a prohibition instruction for prohibiting a use of the power saving method to the communication interface in the case where the disconnection of the first communication link is detected and in a case where it is determined that the predetermined condition is satisfied, wherein the prohibition instruction is not supplied to the communication interface in a case where it is determined that the predetermined condition is not satisfied, wherein the communication interface is configured to maintain a state of a second communication link, which is different from the first communication link, being established by using the normal method without using the power saving method in a case where the communication interface establishes the second communication link with the external device after acquiring the prohibition instruction in response to the disconnection of the first communication link.

14. The method as in claim 13, wherein the specific communication link is a communication link established for the first time between the communication interface and the external device, and after the predetermined time has elapsed without the prohibition instruction having been supplied to the communication interface since the specific communication link was established:

whether the predetermined condition is satisfied is not determined; and the prohibition instruction is not supplied to the communication interface.

* * * * *